United States Patent
Willemse et al.

(10) Patent No.: US 6,387,489 B2
(45) Date of Patent: May 14, 2002

(54) DECORATIVE SHEET AND PROCESSES FOR THE PRODUCTION OF SHEETS

(75) Inventors: Remco Willemse, Weert; Alex Van de Wall, Geldrop; Henricus Kömhoff, Stramproy, all of (NL)

(73) Assignee: Trespa International B.V. (NL)

(*) Notice: Subject to any disclaimer, the term of this patent is extended or adjusted under 35 U.S.C. 154(b) by 0 days.

(21) Appl. No.: 09/800,834

(22) Filed: Mar. 7, 2001

(30) Foreign Application Priority Data

Mar. 13, 2000  (DE) .......................................... 100 12 136

(51) Int. Cl.⁷ ................................................. D02G 3/00
(52) U.S. Cl. ................. 428/359; 428/292.4; 428/297.4; 428/300.7; 428/326; 428/332; 428/340; 428/364; 428/220
(58) Field of Search ........................... 428/292.4, 297.1, 428/297.4, 300.7, 381.4, 326, 332, 333, 340, 220, 364, 359

(56) References Cited

U.S. PATENT DOCUMENTS 3,673,020 A * 6/1972 De Jaeger 4,503,115 A * 3/1985 Hemels et al.

FOREIGN PATENT DOCUMENTS

| EP | 0 081 147 | 6/1987 |
|----|-----------|--------|
| GB | 1015803   | 1/1966 |

* cited by examiner

Primary Examiner—Merrick Dixon
(74) Attorney, Agent, or Firm—ProPat, L.L.C.

(57) ABSTRACT

A decorative sheet arranged on the outside or inside of buildings is composed of a compression-molded core made from one or more core layers. The core contains cellulose fibers or wood fibers, bound to one another by a hot-curing resin. Each core layer is composed of wood fibers or of cellulose fibers having lengths from 0.3 to 30 mm, and is containing pigments or is without pigments. The pigments are uniformly distributed within the core layer, and their proportion by weight is from above 0 to 20% by weight of the mixture made from pigments and from wood fibers or cellulose fibers. The pigments are colorfast, and weathering of the wood fibers or cellulose fibers at the surfaces of the sheet causes the original coloration of the core surfaces to change so that, when dry, the core is covered by a gray-silver patina, but substantially regains its original coloration when wet.

15 Claims, 1 Drawing Sheet

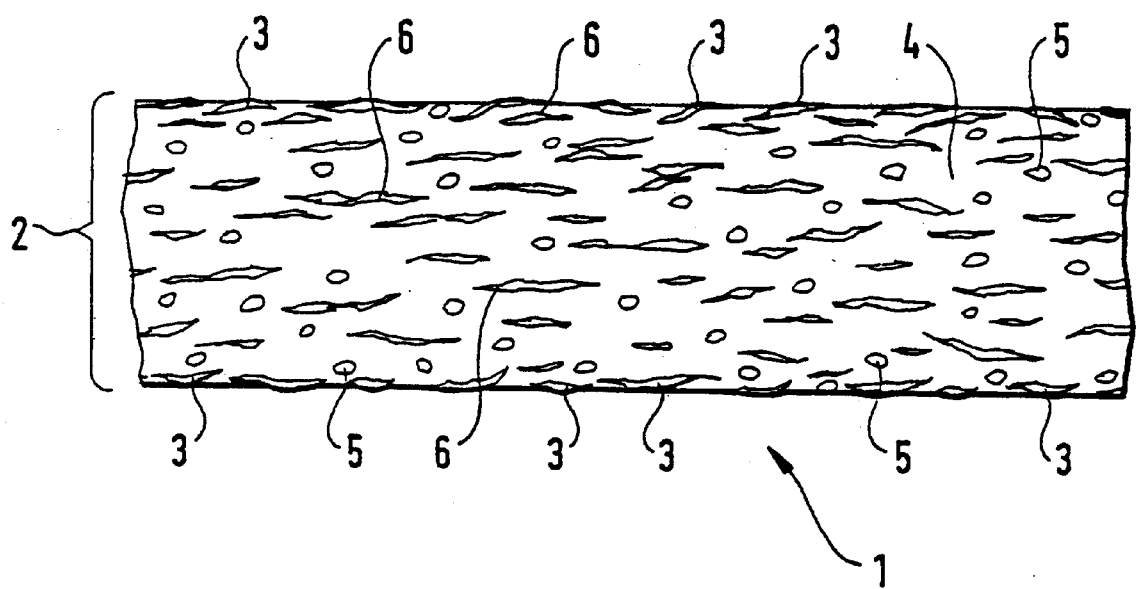

DECORATIVE SHEET AND PROCESSES FOR THE PRODUCTION OF SHEETS

BACKGROUND OF THE INVENTION

1. Field of the Invention

The invention relates to a decorative sheet comprising a compression-molded core having one or more core layers, said core layers being prefabricated layers made from wood fibers and/or of cellulose fibers, surrounded and bound by hot-curing resin, and also to the use of a sheet of this type, and to processes for the production of the sheets.

2. Description of the Related Art

Sheets made from wood chips and wood fibers with a matrix of amino plastic or of phenolic resins or cement are known from the prior art, as are plywood sheets, these having uniform density and being suitable for outdoor use or use in damp indoor areas. However, unlike laminate sheets, sheets of this type are not maintenance-free, and their marked absorption of water through the unsealed surface means that they regularly require comprehensive treatment. Absorption of water can cause severe swelling with an increase in the thickness of the sheet. These sheets then have low strength and are unsightly.

U.S. Pat. No. 3,673,020 (which corresponds to German laid-open patent application 19 12 300) describes a decorative molded sheet made from sawdust and comprising a matrix of phenolic resin, the resin content being from 5 to 15% by weight, based on the dry weight of the sawdust. The weathering resistance of this molding is unsatisfactory. In weathering tests there is marked absorption of water with associated edge swelling and splitting of the compression-molded core, causing surface cracking after just a few weeks.

Lightweight structural panels as described in British Patent 1 015 803 comprise surface layers composed, for example, of wood shavings of minimum length about 50 mm. These wood shavings predominate within the total weight of the sheet, while the proportion of resin is only small, for example in the range from 6 to 10% by weight. The resin serves merely to bond the wood particles to one another. The density of these lightweight structural panels is relatively low, not more than 450 kg/m$^3$.

U.S. Pat. No. 4,503,115 (which corresponds to European Patent 0 081 147) discloses a decorative structural panel composed of a compression-molded core made from wood particles surrounded by hot-curing phenol-formaldehyde resin. One or both surfaces of the core of the structural panel has/have decorative layers composed of a woven or non-woven or other fabric or of a plastic film or a paper foil or wood veneer and/or of a layer formed by liquid coating. The wood fibers and/or cellulose fibers of the core have a maximum length of 20 mm, and the wood fibers here have been coated with the hot-curing phenol-formaldehyde resin in aqueous solution or dispersion. The amount of resin is more than 150 g for each 1000 g of dry fibers, and extends up to 900 g. The water content of the wood fibers is of the order of from 3 to 10% by weight, and the density of the structural panel is from 1100 to 1500 kg/m$^3$. The decorative layer is composed in particular of a melamine-formaldehyde-resin-saturated decorative foil with a weight per unit area of from 80 to 400 g/m$^2$. The decorative layer comprises, where appropriate, a filler and/or a dye. If the surface of the compression-molded core has been decorated by liquid coating using a crosslinked acrylic resin, urethane resin, epoxy resin or melamine resin, this liquid coating comprises, where appropriate, a filler and/or a dye.

This decorative structural panel is produced by arranging one or more mechanically precompacted layers based on wood fibers on top of one another and press-molding these with heat to form the core of the structural panel, with curing of the hot-curing phenol-formaldehyde resin of the precompacted layers. One or both surfaces of the core is/are provided with a decorative layer, which is either applied to the precompacted mat made from one or more layers, or applied to the core once it has been obtained by press-molding this mat.

This known structural panel has very consistent longitudinal and transverse dimensional stability, and even when subjected to the effects of severe changes in weather its dimensional stability remains at a high level. Compared with other known sheets made from wood chips, from wood fibers or from cellulose fibers, this structural panel has higher flexural strength, higher tensile strength and higher transverse strength, higher dimensional stability and reduced water absorption. This structural panel is a laminate made from previously press-molded wood fiber/resin layers and decorative layers, and its visible color remains unchanged over long periods since the weathering-resistant decorative layers protect the surfaces of the core.

SUMMARY OF THE INVENTION

In contrast, the object of the invention is to propose a decorative sheet of the type mentioned at the outset, and a process for producing the sheet, the sheet having the appearance of a sheet of solid wood with a patina effect on the surfaces of the sheets and with a coloration when wet which differs from that when the sheet is dry. The object includes retaining the transverse and longitudinal dimensional stability, and flexural strength and tensile strength, and also low water absorption, of the structural panel of U.S. Pat. No. 4,503,115 (equivalent to European Patent 0 081 147).

The object is achieved by means of the sheet described at the outset with a core layer which comprises wood fibers and/or cellulose fibers of length from 0.3 to 30 mm, and with some free fibers at the surface of the core layer. In one embodiment of the invention, the core layer comprises pigments, these having been selected from the group consisting of inorganic, colored oxidic pigments, inorganic pigments with hydroxyl groups, inorganic sulfidic pigments, carbon black pigments, phthalocyanine pigments and quinacridone pigments. The pigments have in particular been selected from the group consisting of titanium dioxide, zinc sulfide, zinc sulfate, red and yellow iron oxide, blue phthalocyanine pigments, lamp black pigments, oxidic black pigments and quinacridone pigments with violet-red hues.

It is useful that the weathering of the wood fibers and/or cellulose fibers on the surfaces of the core layer gives a gray-silver-colored patina. The gray-silver patina here overlies the original color of the core layer at the surfaces of the sheet.

In a process of the invention for producing sheets, one or more mechanically precompacted layers made from cellulose fibers and/or from wood fibers, enclosed by a hot-curing resin, are placed one on top of another layer and press-molded to one another, applying heat to the layers to bind them together to a core, curing the resin within the cure, and introducing pigments into the resin prior to resin-coating the cellulose fibers and/or wood fibers within the mechanically precompacted layers. According to the process, without applying any liquid coating to the surfaces or applying a coating of decorative films, plastic films, paper foils or wood veneers, the precompacted layers are press-molded to one another at a temperature of from 120 to 180° C. and at a pressure of from 30 to 100 bar to form sheets.

In using the sheets of the invention as a facade cladding in the form of a curtain facade, of a panel screening a wall or roof, or of cladding for a balcony, or of a parapet panel or apron panel, the sheets are subjected to direct external weathering which causes slight weathering changes in the resin and the wood fibers and/or cellulose fibers which are directly arranged at the surfaces of the sheets, changing the original color of the sheets. Specifically, the slight weathering changes in the resin release some of the fibers at the surfaces of the sheets and cause due to this release some slight color changes to the sheets, but not any noticeable change in the physical, mechanical or chemical properties of the sheets. During this process, the surfaces of the sheets are given a patina effect, caused by a translucent gray-silver color which overlays the surfaces. When dry, the sheets then have the appearance of sheets of solid natural wood with a patina effect. If the sheets becomes moist or wet as a result of weathering, this patina effect disappears and the sheets is given their original color. The color change on the transition from the dry state to the wet state of a sheet is explained by the different reflection properties of the sheet in these states. In the dry state, the irregular surface with its slight weathering changes reflects the light nonuniformly and nondirectionally. In the wet state, the surface of the sheet has been moistened and becomes uniform, reflecting the light more directionally and producing a perceived color similar to that of the sheet prior to its slight change by weathering. As a result of these color changes, the sheet gives the impression that it is natural wood and certainly not a laminate made from a variety of layers press-molded to one another. It has all of the technical and physical advantages of a laminated sheet composed of layers and press-molded at high pressure and temperature, for example high strength, low tendency to split on impact, dimensional stability and low moisture absorption. Various types of natural wood can be imitated by appropriately selecting and combining or mixing the pigments added.

The patina effect on the sheet may in particular be utilized for architectural purposes, since the color of facade cladding made from sheets of this type appears different in different types of weather, producing the impression that the facade cladding has been made from solid natural timber. The patina effect normally occurs with all types of wood, and architects give preference to the use of some types of wood as decorative elements due to their particularly beautiful patina effect. Teak and jacaranda are among these types of wood.

U.S. Pat. No. 4,503,115 gives details of the production of the wood fibers for the layers which are press-molded to form the core, and the disclosure content of that publication is incorporated into the present description by way of reference.

BRIEF DESCRIPTION OF THE DRAWING

The FIGURE of the drawing is a cross-sectional view of a sheet according to the invention having a core or a core layer.

DETAILED DESCRIPTION OF THE PREFERRED EMBODIMENTS

The single FIGURE shows a section through a sheet 1 of the invention, which has a core or a core layer 2 made from wood fibers and/or cellulose fibers 6 located in its interior and resin 4 which encloses pigments 5. The surfaces of the core layer 2 have wood fibers and/or cellulose fibers 3 located externally, and these are released by the weathering of the resin 4 which surrounds the fibers 3. The released fibers 3 undergo only slight changes on weathering.

The core layer 2 is composed of one or more layers made from wood fibers and/or from cellulose fibers 3, 6 and resin 4, the proportion of the fibers being from 50 to 90% by weight, in particular 70% by weight of the total core weight. The core layer 2 is generally assembled from one to three layers. Cellulose fibers and industrial waste made from wood, paper or cellulose, for example wood flour or mechanical wood pulp, may be added to the wood fibers. Some of the wood fibers and cellulose fibers, or of the wood waste, may be replaced by plastic waste in the form of fibers or pellets. The wood chips are softened applying steam at a pressure of from 1 to 10 bar in a steamer, and then comminuted to give wood fibers of length from 0.3 to 30 mm, of average length from 0.5 to 3 mm and of average diameter from 0.025 to 0.05 mm. The length and diameter of the cellulose fibers are within the same ranges, the diameter range being from 0.01 to 1 mm. During the process of breakdown by steam to give fibers, or immediately prior to drying, the wood particles may be subjected to a chemical reaction with formaldehyde, for example by vapor-treatment at from 3 to 10 bar and at a temperature of from 80 to 180° C. This pretreatment gives particularly dimensionally stable and water-resistant sheets. A phenol-formaldehyde resin is added to bind the loose wood fibers, either while still moist or after drying to 3–10% by weight moisture content. Particularly suitable phenol-formaldehyde resins are described in U.S. Pat. No. 4,503,115, as are known flame-retardant additives which are added to the resin.

The amount of resin applied to the fibers is from 15 to 90% by weight, based on the fiber weight, in particular from 15 to 60% by weight. The resin-treated fibers are then, for example, dried using hot air to a residual moisture level of from 2 to 15% by weight, preferably from 4 to 10% by weight, whereupon some curing of the resin takes place.

After drying, the fibers are stored or passed directly to spreader equipment. The resin-treated fibers may be further processed without or with pigments. In the latter case, before the resin-treated fibers are further processed they are mixed with pigments, for example those having a size of from 10 μm to 1.5 mm. The proportion of the pigments is from above 0 to 20% by weight of the total weight of resin-treated fibers and pigments. The mixture made from resin-treated fibers and pigments is then directly introduced to the spreader equipment which deposits the fibers and the pigments continuously and uniformly with random orientation, producing, distributed across the entire width of a horizontal conveyor belt, a web-like mat, which is press-molded either individually or together with other web-like mats of this type, to form the core layer 2 of the sheet 1. After continuous shaping of the mat on the conveyor belt, using scrapers, brushes, belts or rollers, the mat is given a preliminary press-molding and compacted, with thickness reduction, at from about 3 to 25 bar in calendering equipment. The precompacted mat is compression-molded and fully cured in a compression-molding apparatus at a temperature of from 120 to 200° C. and at a pressure of from 30 to 100 bar. During the compression molding, the full curing of the resin produces a crosslinked, homogeneous layer made from wood fibers and cellulose fibers 6 and resin 4 and enclosing the pigments 5. If two or more mats are press-molded to form a sheet 1, pigments are added only to the two outermost mats, while no color pigments are present in the mat(s) located between outermost mats. Suitable pigments are titanium dioxide, zinc sulfide, zinc sulfate, red and yellow iron oxide, and quinacridone pigments with violet-red hues. Quinacridone pigments generally have violet-red hues. The fundamental unit for the pigments is quinacridone $C_{20}H_{12}N_2O_2$, which in solution exhibits a yellow coloration with blue-green fluorescence. The pigments are quite generally those selected from the class consisting of the inorganic, colored oxidic pigments, inorganic pigments with hydroxyl groups, inorganic sulfidic pigments, carbon black pigments and quinacridone pigments.

Resins which may be used for coating the cellulose fibers and/or wood fibers, besides hot-curing phenol-formaldehyde resins, are mainly melamine resins or epoxy resins. The proportion of resin is generally from 10 to 50% by weight in the mixture made from cellulose fibers and/or wood fibers and from the resin. The proportion of cellulose fibers and/or of wood fibers in this mixture may be from 50 to 90% by weight.

The density of the sheet 1 is in the range from 1100 to 1500 $kg/m^3$, and the sheets produced have thicknesses of from 2 to 40 mm, in particular from 2 to 20 mm. As mentioned above, the hot-curing resin comprises the pigments, but it is also possible to mix the pigments with the resin-coated wood fibers and/or cellulose fibers. The proportion of the pigments is generally from above 0 to 20% by weight of the weight of the mixture made from pigments and from wood fibers and/or cellulose fibers. The size of the pigments is from 10 $\mu$m to 1.5 mm. By choosing different pigments it is possible to achieve different colorings of the core layer 2. The wood fibers and/or cellulose fibers at the surfaces of the core layer undergo changes on weathering, giving a patina effect as a result of which the visible surface of the sheet 1 has a gray-silver patina which overlays the original color of the core layer 2.

EXAMPLE 1

Sheets made from wood fibers and from a phenolic resin and comprising no added pigment have a brown coloration. After changes due to weathering, the sheets have the color of weathered jatoba wood.

EXAMPLE 2

Sheets made from wood fibers, from a phenolic resin and from 1 to 5% by weight of titanium dioxide, based on the total weight of resin-treated fibers and pigments, have a pale color similar to that of spruce. After changes on weathering, the color of the sheets is like that of weathered American cherry and/or European oak.

EXAMPLE 3

Sheets made from wood fibers, from a phenolic resin, and also from 1 to 5% by weight of titanium oxide and from 0.05 to 1% by weight of iron oxide red, in each case based on the total weight of resin-treated fibers and pigments, have a color like that of American cherry. After changes on weathering, the color of the sheets is like that of weathered meranti wood.

Sheets of this type are used for external cladding of buildings, for example in curtain facades, as panels screening walls or roofs, as parapet panels or apron panels, or as facings for balconies. This list is certainly not comprehensive, and does not place any restriction on possibilities for using the sheets of the invention.

What is claimed is:

1. A decorative sheet, comprising a compression-molded core having one or more core layers, said core layers being prefabricated layers made from wood fibers or cellulose fibers surrounded and bound by hot-curing resin, wherein the single core layer comprises wood fibers or cellulose fibers having lengths from 0.3 to 30 mm and pigments and wherein there are fibers which are directly arranged at the surfaces of the core layer(s) and are released by the weathering of the hot-curing resin.

2. The sheet as claimed in claim 1, wherein the pigments of the core layer(s) are selected from the group consisting of inorganic, colored oxidic pigments, inorganic pigments with hydroxyl groups, inorganic sulfidic pigments, carbon black pigments, phthalocyanine pigments and quinacridone pigments.

3. The sheet as claimed in claim 1, wherein the pigments of the core layer(s) are selected from the group consisting of titanium dioxide, zinc sulfide, zinc sulfate, red and yellow iron oxide, blue phthalocyanine pigments, lamp black pigments, oxidic black pigments and quinacridone pigments with violet-red hues.

4. The sheet as claimed in claim 1, wherein weathering of the resin and of the wood fibers and cellulose fibers on surfaces of the core layer(s) gives a gray-silver-colored patina.

5. The sheet as claimed in claim 4, wherein the gray-silver patina overlies an original color at the surfaces of the sheet core layer(s).

6. The sheet as claimed in claim 4 or 5, wherein an original coloration of the sheet has a gray-silver patina when the sheet is dry, and when the sheet is wet the coloration is substantially the same as the original coloration.

7. The sheet as claimed in claim 1, wherein the cellulose fibers or wood fibers have been coated with a hot-curing phenol-formaldehyde resin, melamine resin or epoxy resin, the proportion of resin being from 10 to 50% by weight and the proportion of cellulose or of wood being from 50 to 90% by weight of the total weight of the mixture made from cellulose fibers or wood fibers and resin.

8. The sheet as claimed in claim 1, wherein the density of the sheet is from 1100 to 1500 $kg/m^3$ and the thickness of the sheet is from 2 to 40 mm, in particular from 2 to 20 mm.

9. The sheet as claimed in claim 1, wherein the hot-curing resin comprises the pigments.

10. The sheet as claimed in claim 1, wherein the proportion of the pigments is equal to or greater than from 0 to 20% by weight of the weight of the mixture made from wood fibers or cellulose fibers and pigments.

11. The sheet as claimed in claim 9 or 10, wherein the pigments have a size from 10 $\mu$m to 1.5 mm and have been mixed with the resin-coated wood fibers or resin-coated cellulose fibers.

12. The sheet as claimed in claim 1, wherein said sheet comprises a curtain facade, a panel screening, a wall or roof, a parapet panel or apron panel, a facing for a balcony or an external cladding of buildings.

13. A process for producing sheets comprising the steps of:

placing one or more mechanically precompacted layers made from cellulose fibers or from wood fibers, enclosed by a hot-curing resin, one on top of another layer and press-molding the layers with one another, applying heat to the layers to bind them together to a core, curing the resin within the core, introducing the pigments into the resin prior to resin-coating the cellulose fibers or wood fibers within the mechanically precompacted layers, and wherein the fibers at the surfaces of the core layer of the produced sheets undergo changes on weathering, resulting in a patina effect.

14. A process for producing sheets comprising the steps of: placing one or more mechanically precompacted layers made from cellulose fibers or from wood fibers, enclosed by a hot-curing resin, one on top of another layer and press-molding the layers with one another, applying heat to the layers to bind them together to a core, curing the resin within the core and mixing the pigments with the resin-treated cellulose fibers or wood fibers of at least one layer prior to press-molding of the layers, and wherein the fibers at the surfaces of the core layer of the produced sheets undergo changes on weathering, resulting in a patina effect.

15. The process as claimed in claim 13 or 14, wherein the precompacted layers are press-molded to one another at a temperature of from 120 to 180° C. and at a pressure of from 30 to 100 bar to form the core of a sheet.

\* \* \* \* \*